United States Patent
Moon et al.

(10) Patent No.: US 12,517,360 B2
(45) Date of Patent: Jan. 6, 2026

(54) DISPLAY DEVICE

(71) Applicant: SAMSUNG ELECTRONICS CO., LTD., Suwon-si (KR)

(72) Inventors: Seokil Moon, Suwon-si (KR); Changkun Lee, Suwon-si (KR); Jongyoung Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 269 days.

(21) Appl. No.: 18/213,610

(22) Filed: Jun. 23, 2023

(65) Prior Publication Data

US 2024/0061247 A1 Feb. 22, 2024

Related U.S. Application Data

(63) Continuation of application No. PCT/KR2023/008274, filed on Jun. 15, 2023.

(30) Foreign Application Priority Data

Aug. 19, 2022 (KR) .................. 10-2022-0104272
Nov. 23, 2022 (KR) .................. 10-2022-0158533

(51) Int. Cl.
*G02B 27/01* (2006.01)
*G02B 6/00* (2006.01)
(Continued)

(52) U.S. Cl.
CPC ........... *G02B 27/0172* (2013.01); *G02B 6/00* (2013.01); *G02B 27/0081* (2013.01);
(Continued)

(58) Field of Classification Search
CPC .............. G02B 27/017; G02B 27/0172; G02B 2027/0174; G02B 2027/0178
See application file for complete search history.

(56) References Cited

U.S. PATENT DOCUMENTS 10,095,045 B2 10/2018 Robbins et al.
10,642,045 B2 5/2020 Wall et al.
(Continued)

FOREIGN PATENT DOCUMENTS

CN 114779479 A 7/2022
KR 10-2003-0014348 A 2/2003
(Continued)

OTHER PUBLICATIONS

Kress, B., C., et al. "Holographic optics in planar optical systems for next generation small form factor mixed reality headsets" Light: Advanced Manufacturing (2022)3:42, 31 pages. https://doi.org/10.37188/lam.2022.042.
(Continued)

*Primary Examiner* — Michelle R Connelly
(74) *Attorney, Agent, or Firm* — Sughrue Mion, PLLC

(57) ABSTRACT

A display device includes a display element configured to output light to display an image, a waveguide including a first surface to which the light is incident and a second surface opposite the first surface, an input coupler provided in the waveguide to input the light into the waveguide, a telecentric assembly configured to cause incident angles of light beams incident to the input coupler to be the same as each other, and an output coupler configured to output light propagating in the waveguide to outside of the waveguide.

14 Claims, 10 Drawing Sheets

(51) Int. Cl.
*G02B 27/00* (2006.01)
*G02B 27/28* (2006.01)

(52) U.S. Cl.
CPC ............... *G02B 2027/0125* (2013.01); *G02B 2027/0178* (2013.01); *G02B 27/281* (2013.01)

(56) References Cited

U.S. PATENT DOCUMENTS

| | | | |
|---|---|---|---|
| 11,048,031 | B2 | 6/2021 | Lee et al. |
| 11,106,041 | B2 | 8/2021 | Miller et al. |
| 11,138,793 | B2 | 10/2021 | Samec et al. |
| 11,256,096 | B2 | 2/2022 | Samec et al. |
| 11,513,350 | B2 | 11/2022 | Waldern et al. |
| 11,703,689 | B2 | 7/2023 | Putilin et al. |
| 2003/0025885 | A1 | 2/2003 | Cotton et al. |
| 2005/0083592 | A1* | 4/2005 | Amitai ............... G02B 5/0257 359/833 |
| 2011/0096401 | A1* | 4/2011 | Levola ............... G02B 27/0172 359/573 |
| 2013/0222384 | A1* | 8/2013 | Futterer ............... G03H 1/26 345/426 |
| 2014/0078591 | A1 | 3/2014 | Mukawa |
| 2016/0026253 | A1 | 1/2016 | Bradski et al. |
| 2018/0299678 | A1 | 10/2018 | Singer et al. |
| 2019/0285891 | A1 | 9/2019 | Lam et al. |
| 2020/0096763 | A1 | 3/2020 | Shin et al. |
| 2020/0174284 | A1 | 6/2020 | Chan et al. |
| 2020/0355976 | A1 | 11/2020 | Ishii |
| 2021/0294006 | A1 | 9/2021 | Colburn et al. |
| 2022/0075185 | A1 | 3/2022 | Valera |
| 2022/0082739 | A1 | 3/2022 | Franke et al. |
| 2022/0099898 | A1 | 3/2022 | Waldern et al. |
| 2023/0296887 | A1* | 9/2023 | Li ....................... G02B 3/0043 345/633 |

FOREIGN PATENT DOCUMENTS

| | | |
|---|---|---|
| KR | 10-2019-0105576 A | 9/2019 |
| KR | 10-2021-0059594 A | 5/2021 |
| WO | 2020/040854 A2 | 2/2020 |
| WO | 2021/091622 A1 | 5/2021 |
| WO | 2022/103473 A2 | 5/2022 |

OTHER PUBLICATIONS

Ni, D., et al., "Uniformity improvement of two-dimensional surface relief grating waveguide display using particle swarm optimization" Optics Express vol. 30, Issue 14, pp. 24523-24543, (2022), 27 pages. https://opg.optica.org/oe/fulltext.cfm?uri=oe-30-14-24523&id=477153.
International Search Report and Written Opinion (PCT/ISA/220, PCT/ISA/210, and PCT/ISA/237) dated Sep. 21, 2023, issued by International Searching Authority for International Application No. PCT/KR2023/008274.
Communication issued Jul. 11, 2025 by the European Patent Office for EP Patent Application No. 23855003.2.
Extended European Search Report dated Oct. 30, 2025, issued by the European Patent Office in European Application No. 23855003.2.
Zhan et al., "Pancharatnam-Berry optical elements for head-up and near-eye displays [Invited]", XP055590395, Journey of the Optical Society of America B, 2019, vol. 36, No. 5 (14 pages total).

* cited by examiner

DISPLAY DEVICE

CROSS-REFERENCE TO RELATED APPLICATIONS

This application is a bypass continuation of International Application No. PCT/KR2023/008274, filed on Jun. 15, 2023, in the Korean Intellectual Property Receiving Office, which is based on and claims priority to Korean Patent Application No. 10-2022-0104272, filed on Aug. 19, 2022 and Korean Patent Application No. 10-2022-0158533, filed on Nov. 23, 2022, in the Korean Intellectual Property Office, the disclosures of which are incorporated by reference herein in their entireties.

BACKGROUND

Virtual reality (VR) refers to a technology that allows people to have a realistic experience in a virtual world created by a computer. Augmented reality (AR) refers to a technology that allows a virtual image to be blended in a physical environment or space of the real world. Near-eye displays in which VR displays or AR displays are implemented to focus a virtual image in space by using a combination of optical and stereoscopic images. In the case of such a display device, display resolution and processing are important.

Optical systems based on waveguides are being researched and developed as AR devices such as AR glasses. A conventional waveguide may input light therein by using free-form surface reflection or multi-mirror reflection or input light therein by using an input-coupling diffractive element such as a diffractive optical element or a holographic optical element. When free-form surface reflection or multi-mirror reflection is used, a structure may be simple and light transmission efficiency may be high, but a viewing angle may be limited, and it may be difficult to make the waveguide relatively thin. Moreover, due to the low uniformity of light propagating through the waveguide, image quality may be degraded.

SUMMARY

A display device according to an embodiment includes a display element configured to output light to display an image, a waveguide including a first surface to which the light is incident and a second surface opposite the first surface, an input coupler provided on the waveguide and configured to input the light into the waveguide, a telecentric assembly provided between the display element and the waveguide, the telecentric assembly being configured to cause incident angles of light beams incident on the input coupler to be same as each other, and an output coupler configured to output light propagating in the waveguide to an outside of the waveguide.

BRIEF DESCRIPTION OF THE DRAWINGS

The above and other aspects, features, and advantages of embodiments will be more apparent from the following description taken in conjunction with the accompanying drawings, in which.

DETAILED DESCRIPTION

Figure 1:
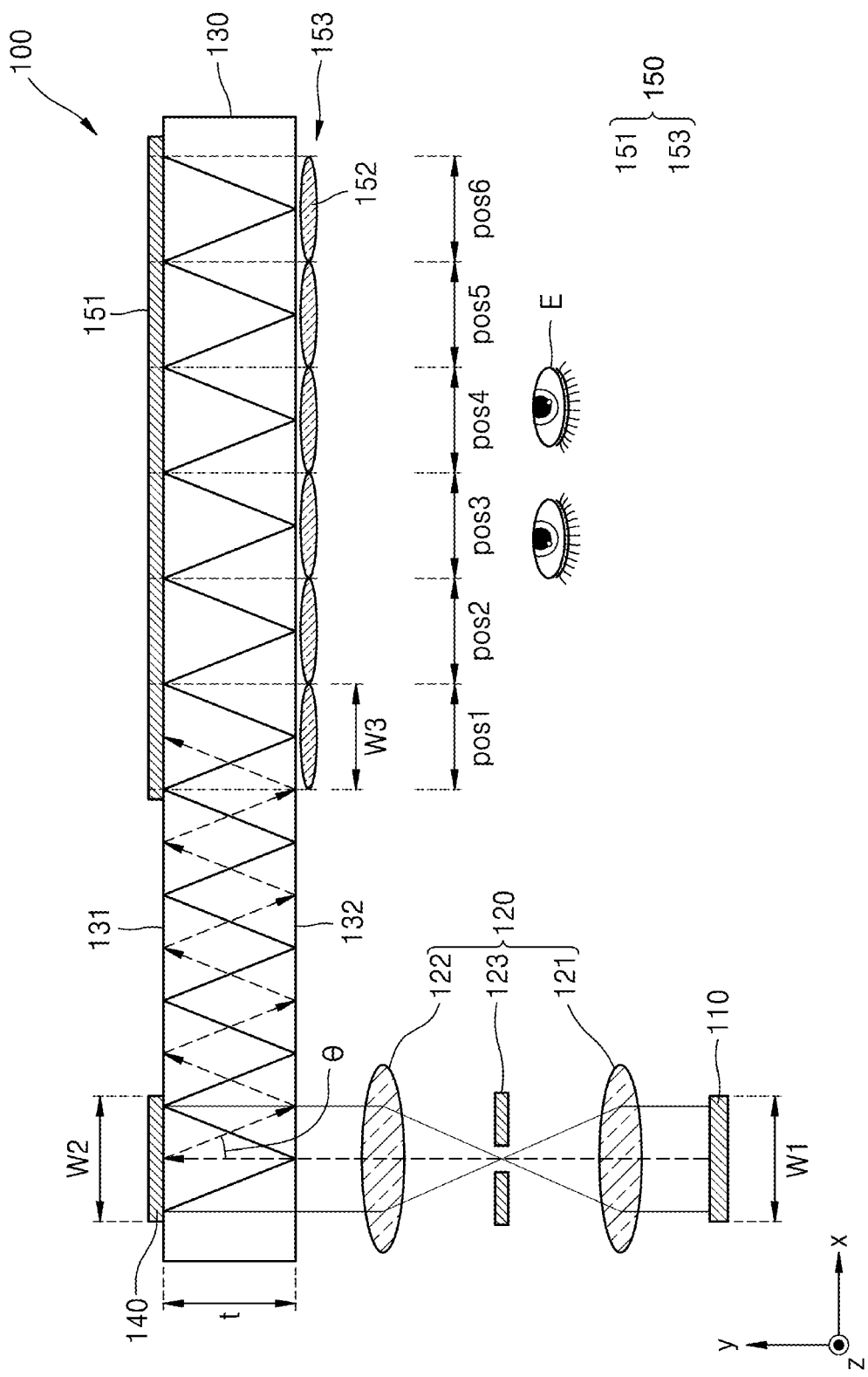
FIG. 1 schematically illustrates a display device according to an embodiment.

Hereinafter, a display device according to various embodiments of the disclosure will be described in detail with reference to the accompanying drawings In the drawings, like reference numerals denote like components, and sizes of components in the drawings may be exaggerated for convenience of explanation. Terms such as first, second, and the like may be used to describe various elements, but the elements should not be limited to those terms. These terms may be used to distinguish one element from another element.

Singular forms include plural forms unless apparently indicated otherwise contextually. When a portion is referred to as "comprising" a component, the portion may not exclude another component but may further include another component unless stated otherwise. In addition, the size or thickness of each component in the drawings may be exaggerated for clarity of a description. Moreover, when it is described that a certain material layer is present on a substrate or another layer, the material layer may be present in direct contact with the substrate or the other layer or a third layer may be present therebetween. Throughout the disclosure, the expression "at least one of a, b or c" indicates only a, only b, only c, both a and b, both a and c, both b and c, all of a, b, and c, or variations thereof. In other embodiments below of the disclosure, a material of each layer may be an example and thus another material may be used.

The term used herein such as "unit" or "module" indicates a unit for processing at least one function or operation, and may be implemented in hardware, software, or in a combination of hardware and software.

Certain implementations described here are examples, and do not limit the technical scope of the disclosure in any way. For the brevity of the specification, the description of conventional electronic configurations, control systems, software, and other functional aspects of the systems may be omitted. Connections of lines or connection members between components shown in the drawings are illustrative of functional connections and/or physical or circuit connections, and in practice, may be represented as alternative or additional various functional connections, physical connections, or circuit connections.

The use of the terms of "the above-described" and similar indicative terms may correspond to both the singular forms and the plural forms.

Also, operations constituting a method may be performed in any suitable order unless it is explicitly stated that they should be performed in an order they are described. Also, the use of all exemplary terms (for example, etc.) is only to describe the technical spirit in detail, and the scope of rights is not limited by these terms unless limited by the claims.

FIG. 1 schematically illustrates a display device according to an embodiment.

A display device 100 may include a display element 110 that outputs light to display an image, a waveguide 130 via which light from the display element 110 is transmitted, a telecentric assembly 120 provided between the display element 110 and the waveguide 130, an input coupler 140 that inputs light into the waveguide 130, and an output coupler 150 that outputs light propagating in the waveguide 130 to the outside of the waveguide 130.

The display element 110 may include, for example, a liquid crystal display (LCD), a liquid crystal on silicon (LcoS), an organic light-emitting diode (OLED) display, a light-emitting diode (LED) display, a projector, etc. The display element 110 may process an image signal to form a two-dimensional (2D) image or a three-dimensional (3D) image. According to another embodiment, the display element 110 may include a computed generated holography (CGH) to form a hologram image.

The image output from the display device 110 may be incident to the waveguide 130 and delivered to an eye E of a user through the waveguide 130. Herein, the image may include a concept of image light that displays the image.

The telecentric assembly 120 may be configured to cause an incident angle of light incident to the input coupler 140 to be identical at all positions. The telecentric assembly 120 may include a first lens 121, a second lens 122 separated from the first lens 121, and an optical filter 123 provided between the first lens 121 and the second lens 122. The optical filter 123 may include, for example, a pinhole structure. Light passing through the telecentric assembly 120 may become parallel light beams that may be incident at the same incident angle with respect to the input coupler 140. For example, the light passing through the telecentric assembly 120 may be perpendicularly incident on the input coupler 140.

Light output from the display element 110 may be incident on the telecentric assembly 120 without being diffused. Generally, a diffuser is provided in a display element to diffuse light output from the display element, but the display element 110 according to the embodiment does not include a diffuser and thus may allow the light output from the display element 110 to travel without diffusion. As the light output from the display element 110 travels straight without being diffused, light output from each pixel of the display element 110 may propagate as a straight beam. The pixel may indicate a basic unit to form an image in a display element. As the light output from the display element 110 travels straight without being diffused, light having passed through the telecentric assembly 120 may be incident on the input coupler 140 with the same cross-sectional area as the area of the display element 110. The area of the display element 110 may indicate an effective area used for forming the image in the display element 110. For example, the cross-sectional width of a bundle of lights output from the display element 110 may have the same width as a width W1 of the display element 110. The width W1 of the display element 110 may indicate a horizontal direction (an x-axis direction) of the effective area of the display element 110 or a horizontal-direction (x-axis direction) width with respect to a direction in which the user views an image.

When the straight beam output from the display element 110 is incident on the input coupler 140 through the telecentric assembly 120, light corresponding to each pixel of the display element 110 may be incident on the input coupler 140 as parallel light beams, such that incident angles of light beams incident on the input coupler 140 may be the same. As the incident angles of the light beams incident to the input coupler 140 are the same, an angle of diffraction, $\theta$, of light corresponding to each pixel of the display element 110 in the input coupler 140 and the number of times of reflection in the waveguide 130 may be identical. Thus, the image formed in the display element 110 may be duplicated and propagate with the same light intensity and quality across all pixels.

In a related display device, a diffuser may be provided in front of a display element, such that as light passes through the display element after passing the diffuser, the light may be diffused in each pixel of the display element. Thus, as light corresponding to each pixel is incident to an input coupler at a different angle, the light may propagate at a different angle in a waveguide. Consequently, the intensity of the light may vary with the position of the waveguide. To solve this problem, in an embodiment, the light passes through the display element 110 without being diffused, such that light output from each pixel of the display element 110 may propagate in the form of a relatively thin straight line without being diffused. The telecentric assembly 120 may refine the light corresponding to each pixel, which propagates in the form of a thin straight beam, one more time, by using the optical filter 123. The refined light corresponding to each pixel may be incident on the input coupler 140 in the form of parallel light beams at every position while passing through the second lens 122. As light output from each pixel of the display element 110 travels in a parallel light bundle, incident angles of light beams incident to the input coupler 140 are the same and thus the angles of diffraction, $\theta$, by the input coupler 140 may also be the same. For example, light incident on the input coupler 140 may be incident perpendicularly to the input coupler 140.

With the above-described structure, the waveguide 130 may be configured to have a thickness t satisfying the following Equation 1.

$$t = W1/2 \tan(\theta) \qquad \text{[Equation 1]}$$

Here, W1 indicates a width of the display element 110 and $\theta$ indicates an angle of diffraction of light diffracted in the input coupler 140.

Light corresponding to each pixel of the display element 110 will be referred to as a field.

As the light output from the display element 110 is output without being diffused and is incident on the input coupler 140 in the form of parallel light beams by the telecentric assembly 120, the width W1 of the display element 110, the cross-sectional width of the light passing through the telecentric assembly 120, and a width W2 of the input coupler 140 may be the same. The cross-sectional width of the light may indicate an x-axis direction width, and the width W2 of the input coupler 140 may indicate an effective width in the same direction as the width W1 of the display element 110. The effective width may indicate a horizontal-direction (x-axis direction) width of an area in which light comes. The horizontal direction (x-axis direction) may indicate a horizontal direction with respect to a direction in which a viewer views an image.

The waveguide 130 may include a first surface 131 onto which light is incident, and a second surface 132 opposite the first surface 131. The input coupler 140 may be provided on at least one of the first surface 131 or the second surface 132. FIG. 1 shows an example in which the input coupler 140 is provided on the first surface 131. The input coupler 140 may include, for example, a diffractive optical element or a hologram optical element.

Figure 2:
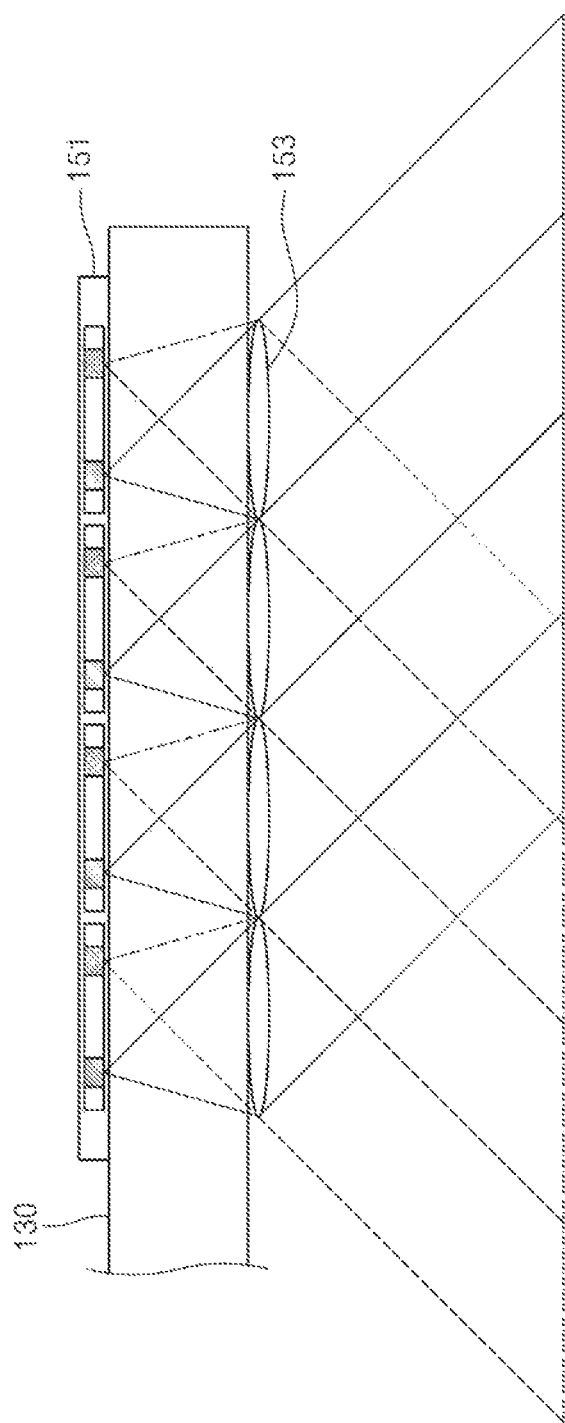
FIG. 2 illustrates an optical path in a display device according to an embodiment.

The output coupler 150 may include a direction-selection diffuser 151 provided on any one of the first surface 131 and the second surface 132 and a lens array 153 included on the other surface of the waveguide 130 to face the direction-selection diffuser 151. The direction-selection diffuser 151 may diffuse light incident at a certain angle and transmit light incident at the angles other than the certain angle. The direction-selection diffuser 151 may include holographic optical elements (HOEs) or volume grating (VG). Referring to FIG. 2, as light propagates to the waveguide 130 while some of fields reaching the direction-selection diffuser 151 are diffused and some other fields are totally reflected, the display device 100 may duplicate an image formed by the display element 110 and at the same time, diffuse respective fields. As light beams diffracted in the input coupler 140 propagate at the same angle in an embodiment, image light transmitted through the waveguide 130 may be duplicated with the same size as the image formed in the display element 110.

To display the image formed by the display element 110 to the viewer, each field needs to spread over a wide range and be delivered to the viewer. In an embodiment, as each field propagates in the form of a thin beam as output from the display element 110, a lens array 153 may spread each field over a wide area to cause the field to enter the eye E of the viewer. For example, the lens array 153 may cause respective fields to propagate to the user in the form of wide parallel light beams. In this case, as all fields propagate at the same angle and are diffracted the same number of times, the image light may be delivered to the user with the same intensity. Thus, the user may view an image having uniform brightness.

Referring back to FIG. 1, the lens array 153 may include a plurality of lenses 152 which may be provided to correspond to positions at which the image light formed in the display element 110 is duplicated. For example, as the image light is delivered through the waveguide 130, a duplicated image may be displayed on a first region pos1, a second region pos2, a third region pos3, a fourth region pos4, a fifth region pos5, and a sixth region pos6. However, the number of duplicated images is not limited thereto. Each lens 152 of the lens array 153 may be provided to correspond to a duplicated image. Thus, a width W3 of the lens 152 may be the same as the width W1 of the display element 110.

Figure 3:
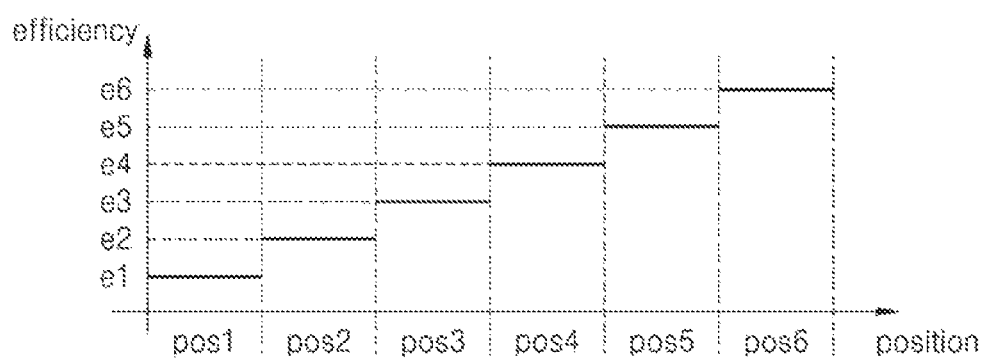
FIG. 3 illustrates a diffraction efficiency of an output coupler with respect to a region of a waveguide of a display device according to an embodiment.

The direction selection diffuser 151 may include a hologram pattern with a diffraction efficiency that increases from an entrance of the waveguide 130 to an exit of the waveguide 130. For example, the direction selection diffuser 151 may include a hologram pattern with a diffraction efficiency that increases in a direction (x-axis direction) in which light propagates from the waveguide 130. FIG. 3 shows a diffraction efficiency of the direction selection diffuser 151 with respect to each region of the waveguide 130. Referring to FIG. 3, the direction selection diffuser 151 may be configured to have a relationship: a diffraction efficiency e1 of the first region pos1<a diffraction efficiency e2 of the second region pos2<a diffraction efficiency e3 of the third region pos3<a diffraction efficiency e4 of the fourth region pos4<a diffraction efficiency e5 of the fifth region pos5. By adjusting the diffraction efficiency of the direction selection diffuser 151 in this way, light intensity may be uniform in a direction in which light propagates from the waveguide 130.

Figure 4:
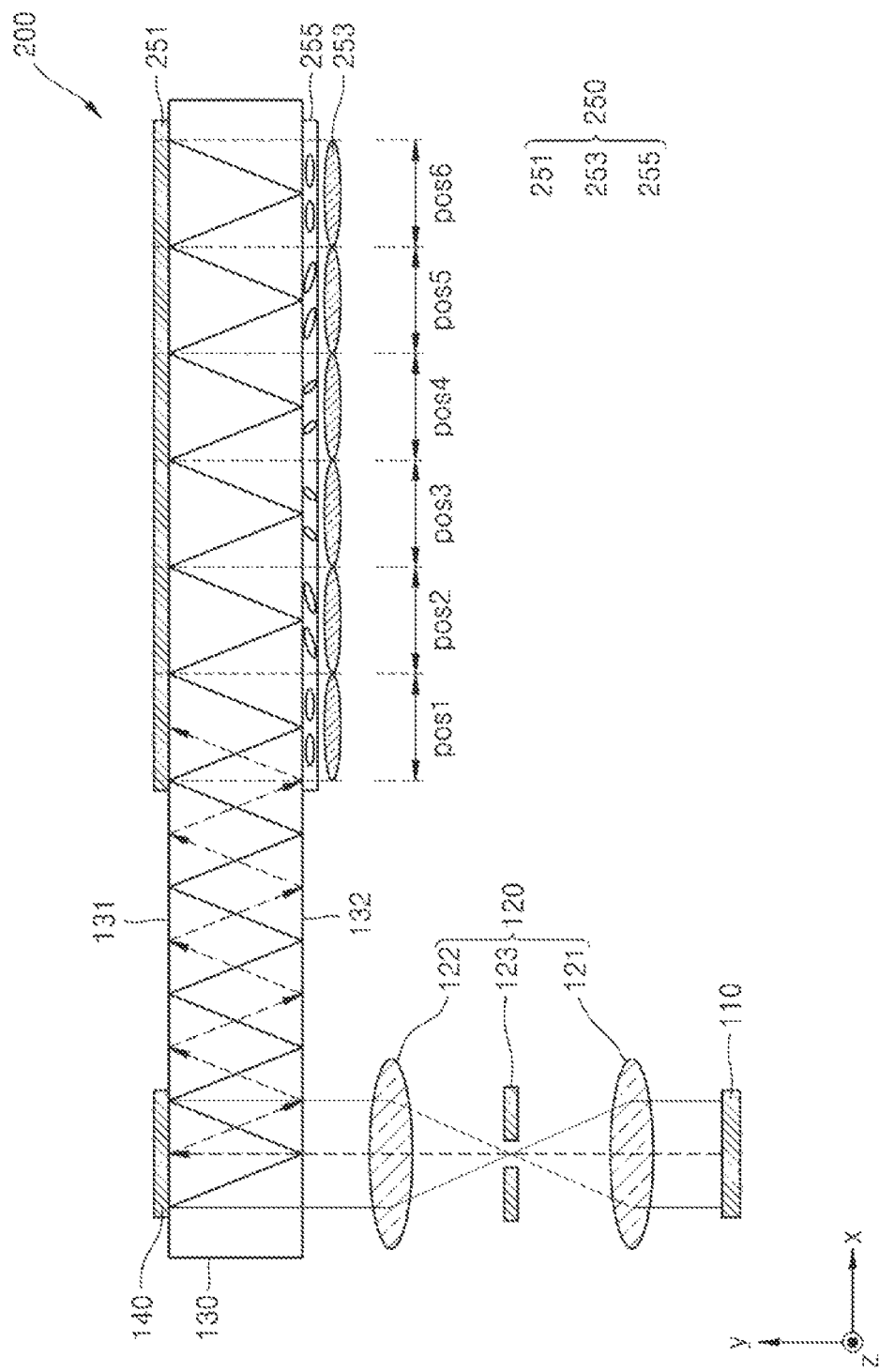
FIG. 4 illustrates a display device according to an embodiment.

FIG. 4 illustrates a display device according to an embodiment.

In FIG. 4, a component using the same reference numeral as in FIG. 1 is substantially the same as described with reference to FIG. 1 and thus will not be described in detail herein.

A display device 200 may include an output coupler 250 that outputs light propagating from the waveguide 130 to the outside of the waveguide 130. The output coupler 250 may include a polarization volume grating 251 provided on one of the first surface 131 and the second surface 132, and a polarization modulation layer 255 and a lens array 253 that are provided on the other surface of the waveguide 130. The polarization volume grating 251 may react to specific polarization. For example, the polarization volume grating 251 may reflect first polarization and transmit second polarization. The polarization volume grating 251 may reflect S polarization, transmit P polarization, reflect right-circular polarization, and transmit left-circular polarization. The polarization modulation layer 255 may modulate the degree of polarization for each region. The polarization modulation layer 255 may include an anisotropic material such as liquid crystal and adjust a polarization degree or a polarization modulation factor with respect to the degree of rotation of the anisotropic material. A diffraction efficiency in the polarization volume grating 251 may change with polarization modulated in the polarization modulation layer 255. In this way, by adjusting the efficiency of light diffracted in the polarization volume grating 251, brightness uniformity may be more easily improved.

By adjusting the polarization degree of the polarization modulation layer 255, the polarization volume grating 251 may have a relationship: the diffraction efficiency e1 of the first region pos1<the diffraction efficiency e2 of the second region pos2<the diffraction efficiency e3 of the third region pos3<the diffraction efficiency e4 of the fourth region pos4<the diffraction efficiency e5 of the fifth region pos5<a diffraction efficiency e6 of a sixth region pos6. As such, by adjusting the diffraction efficiency of the polarization volume grating 251, light intensity may be uniform in a direction in which light propagates from the waveguide 130.

The lens array 253 may be provided under the polarization modulation layer 255. The lens array 253 may spread each field to a relatively wide area to allow the field to enter the eye E of the viewer.

Figure 5:
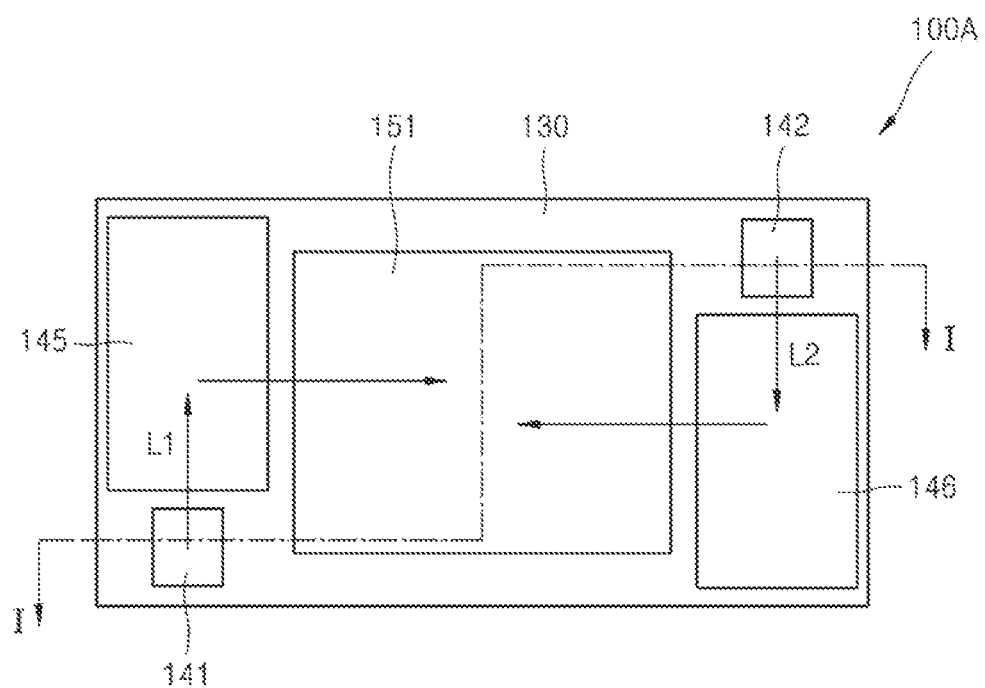
FIG. 5 illustrates an example of a display device according to an embodiment including two display elements.
Figure 6:
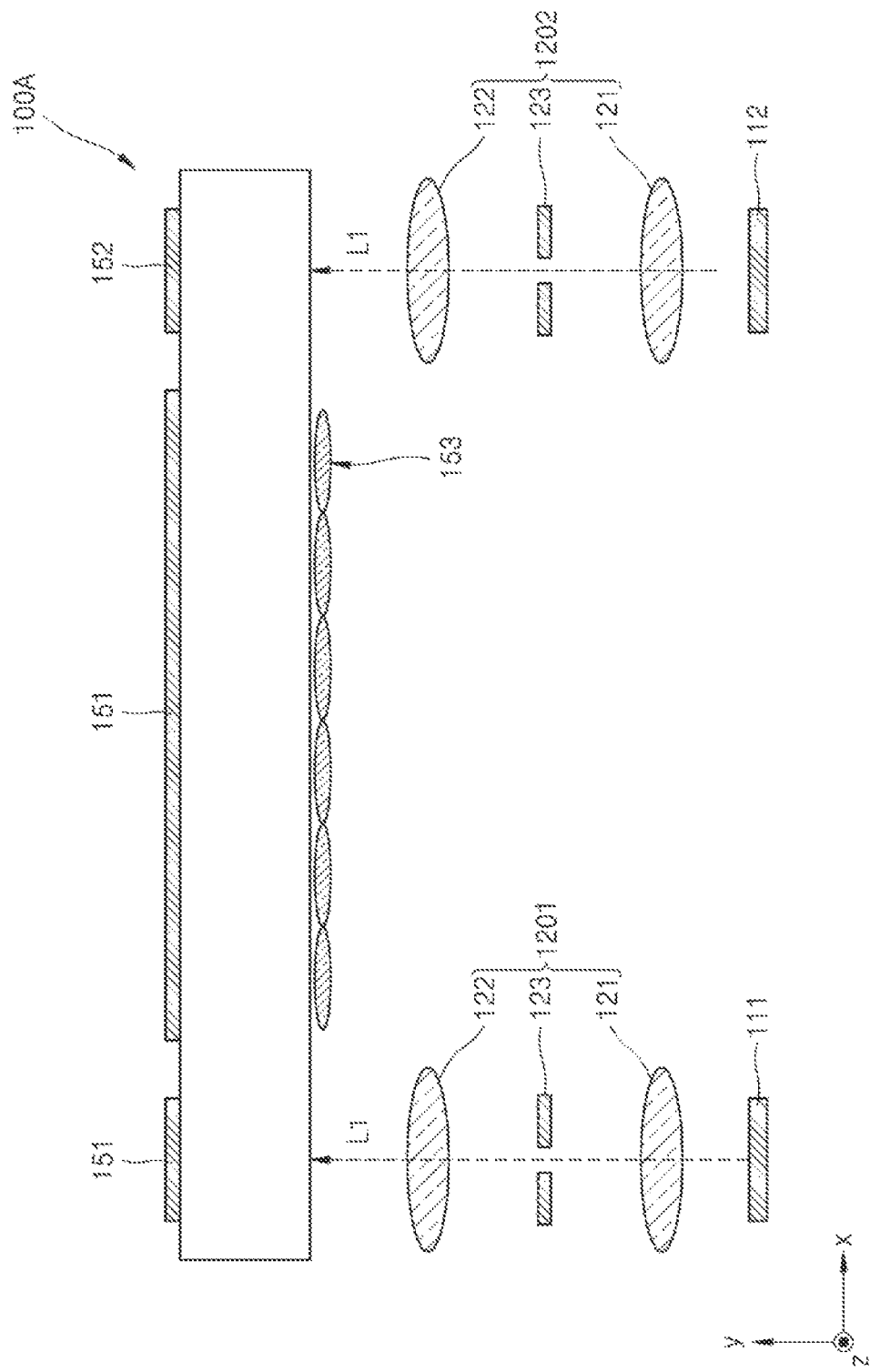
FIG. 6 is a I-I cross-sectional view of FIG. 5.

FIGS. 5 and 6 schematically show a display device including two input couplers. FIG. 5 is a plane view of the display device, and FIG. 6 is an I-I cross-sectional view of FIG. 5.

In FIGS. 5 and 6, a component using the same reference numeral as in FIG. 1 is substantially the same as described with reference to FIG. 1 and thus will not be described in detail herein.

A display device 100A may include a first display element 111 that outputs first light L1 and a second display element 112 that outputs second light L2, in which the first display element 111 may be arranged to emit the first light L1 to be incident on a first side of the waveguide 130 and the second display element 112 may be arranged to emit the second light L2 to be incident on a second side of the waveguide 130. A first input coupler 141 may be included in the waveguide 130 to correspond to the first display element 111, and a second input coupler 142 may be included in the waveguide 130 to correspond to the second display element 112. The first input coupler 141 and the second input coupler 142 may be arranged to face each other diagonally on a surface of the waveguide 130.

A first telecentric assembly 1201 may be arranged between the first element 111 and the waveguide 130, and a second telecentric assembly 1202 may be arranged between the second display element 112 and the waveguide 130. Constructions and working effects of the first telecentric assembly 1201 and the second telecentric assembly 1202 are substantially the same as described with reference to FIG. 1 and thus will not be described in detail.

A first optical path converter 145 may be further included which converts an optical path for directing the first light L1 diffracted in the first input coupler 141 to the direction selection diffuser 151. A second optical path converter 146 may be further included which converts an optical path for directing the second light L2 diffracted in the second input coupler 142 to the direction selection diffuser 151.

In the display device 100A, the first light L1 output from the first display element 111 and the second light L2 output from the second display element 112 respectively propagate symmetrically from both sides of the waveguide 130, thereby offsetting a decrease in the diffraction efficiency of the direction selection diffuser 151 along a propagating direction of light in both directions. Thus, even without adjusting the diffraction efficiency of the direction selection diffuser 151, the intensity uniformity of light propagating along the waveguide 130 may be improved.

Figure 7:
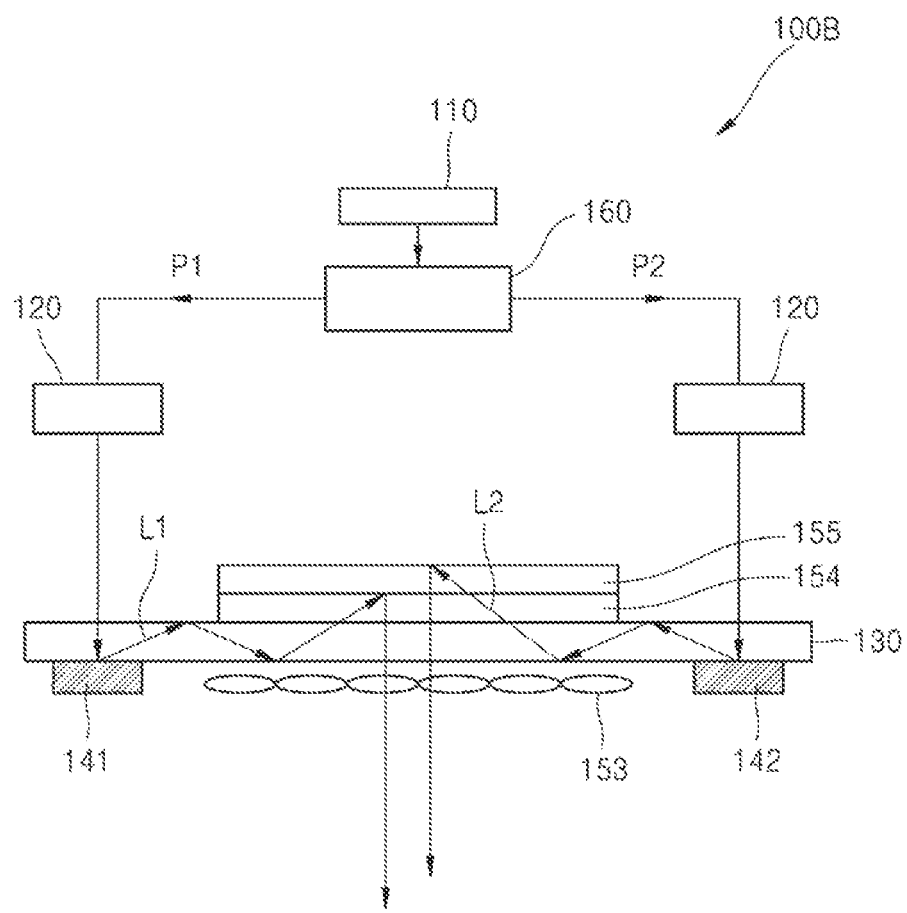
FIG. 7 illustrates an example of a display device according to an embodiment outputting image light, which is formed in one display element, through two paths.

FIG. 7 illustrates a display device according to an embodiment.

An embodiment is shown in which a display device 1006 splits image light output from one display device 110 into two paths through which to send the image light to the waveguide 130.

In FIG. 7, a component using the same reference numeral as in FIGS. 1 and 6 is substantially the same as described with reference to FIG. 1 and thus will not be described in detail herein.

The display device 1006 may further include an optical element 160 that splits light output from the display element 110 to propagate along a first optical path P1 and a second optical path P2. The optical element 160 may include a polarization beam splitter that transmits S polarization and reflects P polarization or a beam splitter that transmits some light and reflects some light.

In each of the first optical path P1 and the second optical path P2, a telecentric assembly 120 may be included which is shown in a simplified manner for convenience. A first direction selection diffuser 154 and a second direction selection diffuser 155 may be stacked on a surface of the waveguide 130. The first direction selection diffuser 154 may diffract the first light L1 reflected in the first input coupler 141, and the second direction selection diffuser 155 may diffract the second light L2 reflected in the second input coupler 142.

The display device 100B may cause the image light output from one display element 110 to propagate symmetrically at both sides of the waveguide 130 through two optical paths. Thus, a decrease in diffraction efficiency in a propagating direction of light in each of the first direction selection diffuser 154 and the second direction diffuser 155 may be offset by propagation of light in both directions. Thus, even without adjusting the diffraction efficiency of the direction selection diffuser 151, the intensity uniformity of light propagating along the waveguide 130 may be improved.

Figure 8:
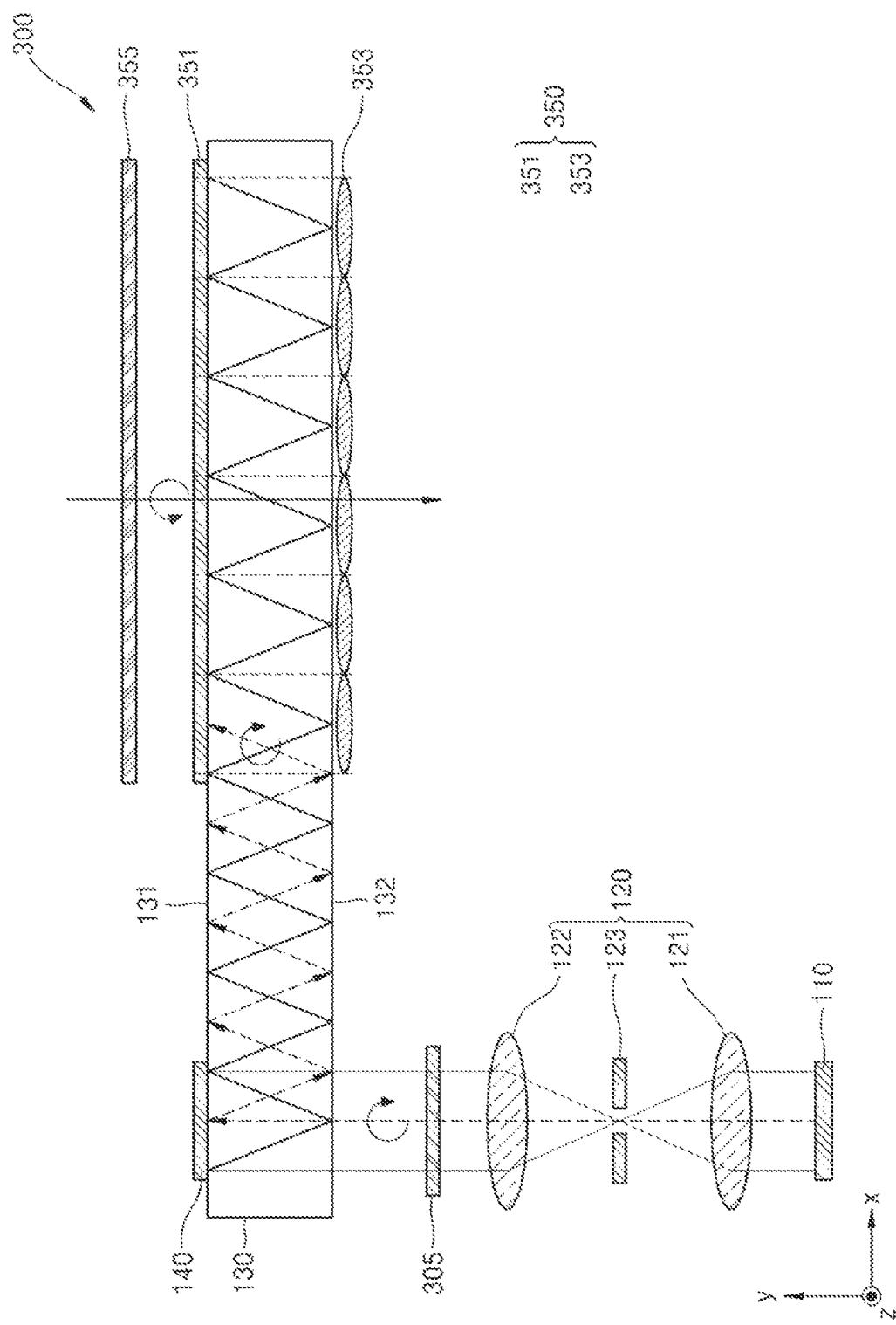
FIG. 8 illustrates an example where an augmented reality (AR) display device is implemented in a display device according to an embodiment.

FIG. 8 schematically illustrates a display device according to an embodiment.

In FIG. 8, a component using the same reference numeral as in FIG. 1 is substantially the same as described with reference to FIG. 1 and thus will not be described in detail herein.

A display device 300 may include an output coupler 350 that outputs light propagating from the waveguide 130 to the outside of the waveguide 130. The output coupler 350 may include a polarization volume grating 351 provided on one of the first surface 131 and the second surface 132, and a geometric phase lens array 353 provided on the other surface of the waveguide 130.

A first circular polarizer 305 may be further provided between the telecentric assembly 120 and the waveguide 130. According to another embodiment, the first circular polarizer 305 may be arranged between the display element 110 and the telecentric assembly 120. The first circular polarizer 305 may convert polarization of incident light into circular polarization. For example, the first circular polarizer 305 may transmit right-circular polarization of incident light passing through the telecentric assembly 120. However, embodiments are not limited thereto such that the first circular polarizer 305 may transmit left-circular polarization. The first circular polarizer 305 may transmit right-circular polarization or left-circular polarization depending on a combination with an output coupler 350 or a second circular polarizer 355 described below.

A second circular polarizer 355 may be provided to be separated from the polarization volume grating 351. The second circular polarizer 355 may be configured to transmit circular polarization in an opposite direction to circular polarization transmitted by the first circular polarizer 355. According to another embodiment, the second circular polarizer 355 may be configured to transmit circular polarization in the opposite direction to circular polarization transmitted by the polarization volume grating 351. The second circular polarizer 355 may selectively transmit light input from the outside of the display device 300 to the waveguide 130, thereby allowing the user wearing the display device 300 to see a real object outside. For example, the display device 300 may implement an AR display device.

An operation of the display device 300 will be described.

An image light formed by the display element 110 may be incident on the first circular polarizer 305 through the telecentric assembly 120. The first circular polarizer 305 may transmit circular polarization of incident light to cause the circular polarization to be incident to the waveguide 130. The right-circular polarization may be reflected from the input coupler 140 and propagate through the waveguide 130 and may be incident to the polarization volume grating 351. The polarization volume grating 351 may diffract certain polarization and linearly transmit polarization other than the certain polarization. For example, the polarization volume grating 351 may diffract right-circular polarization and linearly transmit left-circular polarization. Thus, image light incident of right-circular polarization incident to the polarization volume grating 351 may be diffracted by the polarization volume grating 351 and incident on the geometric phase lens array 353.

The geometric phase lens array 353 may operate as a lens for certain polarization, while operating as a transparent element for conjugate polarization of the certain polarization. The geometric phase lens array 353 may implement augmented reality (AR) by using light of left-circular polarization and right-circular polarization that are conjugate polarization. When image light of right-circular polarization is incident to the geometric phase lens array 353, the geometric phase lens array 353 may operate as a lens for right-circular polarization. Thus, the image light may be spread by the geometric phase lens array 353 and incident on the eye of the viewer.

Left-circular polarization of external light incident to the second circular polarizer 355 from the outside may be transmitted by the second circular polarizer 235. The left-circular polarization may be incident on the polarization volume grating 351 which may linearly transmit the left-circular polarization. The left-circular polarization may be incident on the geometric phase lens array 353 through the waveguide 130. The geometric phase lens array 353 may operate as a transparent element for the left-circular polarization to linearly transmit the left-circular polarization. Light input from the outside of the display device 300 in the foregoing process may be input to the eye of the user who may then see a real object image.

As described above, the display device 300 according to the embodiment may be implemented with an AR display device allowing an image output from the display element 110 and a real object image output from the outside of the display device 300 to be seen together.

A display device according to an embodiment may include a telecentric assembly to cause light emitted from a display element to be incident to a waveguide at the same angle, thereby improving light uniformity. The disclosed display device may be implemented as a wearable type or a non-wearable type.

Figure 9:
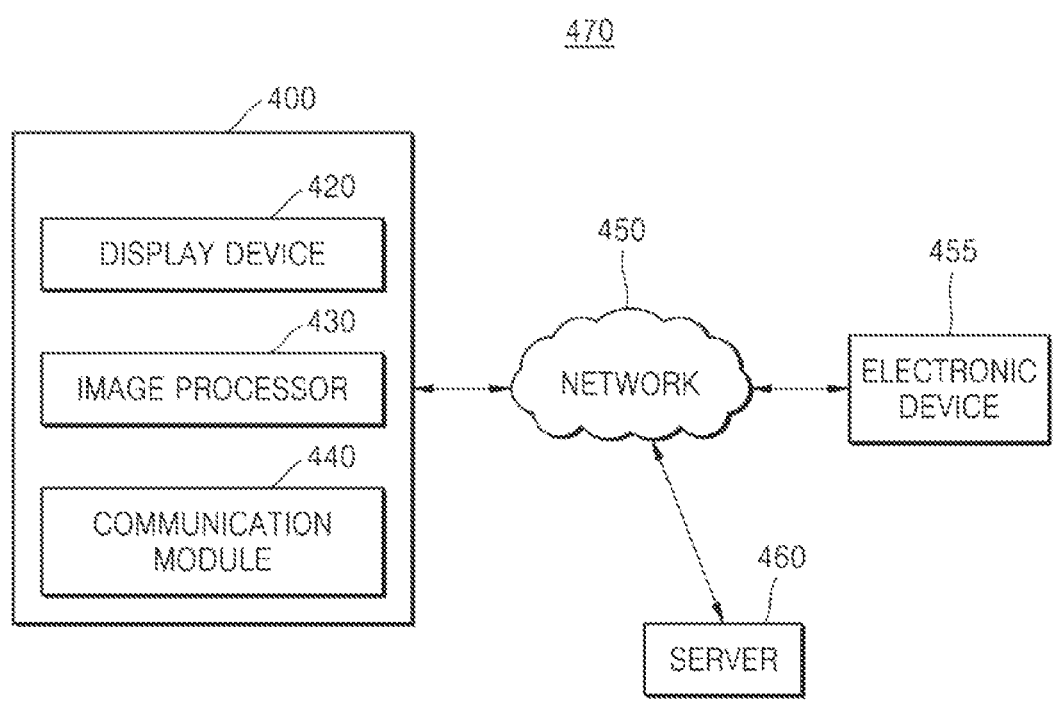
FIG. 9 schematically illustrates an electronic device according to an embodiment.

FIG. 9 is a block diagram of an electronic device according to an embodiment. An electronic device 400 may include a display device 420 according to an embodiment. The display device 420 may include the embodiments described with reference to FIGS. 1 to 8. The electronic device 400 may be included in a network environment 470. In the network environment 470, the electronic device 400 may communicate with another electronic device 455, e.g., a smart phone, or a server 460 through a network 450 (a short-range wireless communication network, a long-range wireless communication network, etc.).

The electronic device 400 may include the display device 420 that displays an image and an image processor 430 that processes an image. The electronic device 400 may include a communication module 440 configured to communicate with the other electronic device 455 or the server 460 through the network 450. An image output from the other electronic device 455 may be received through the communication module 440 and displayed on the display device 420. The image processor 430 may compensate for an optical aberration by considering an aberration for each position in a virtual image by using a hologram generation algorithm to which optimization is applied.

Figure 10:
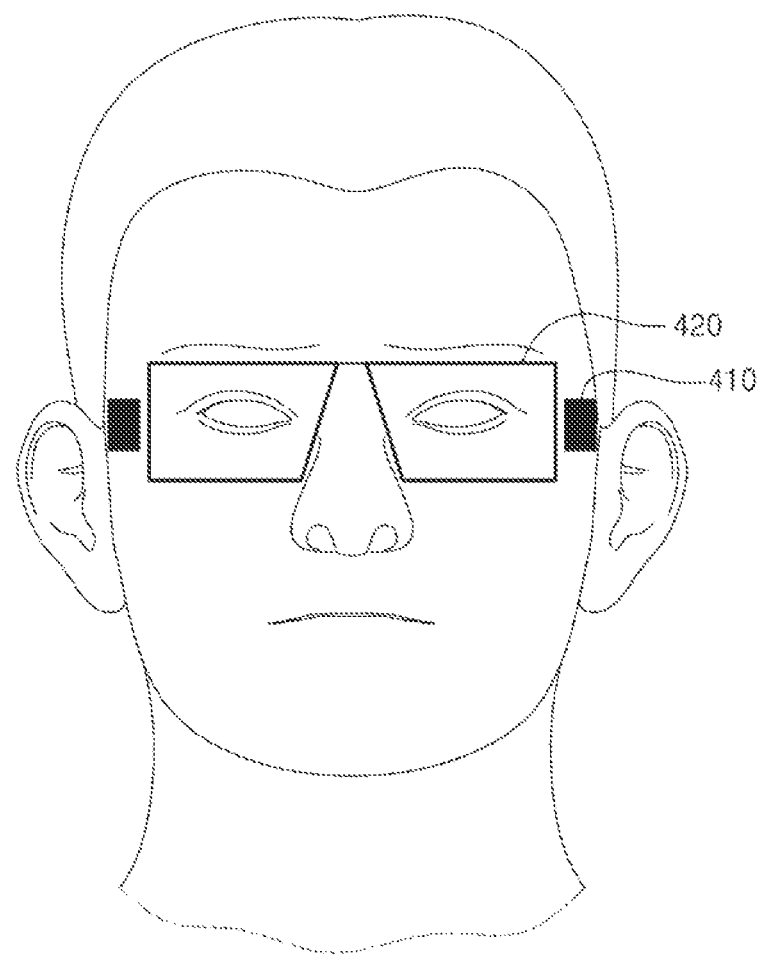
FIG. 10 illustrates an example of a user wearing a display device according to an embodiment.

FIG. 10 illustrates an example where a user wears glasses as a display device according to an embodiment. A glasses-type display device may include a display element 410 that provides an image and a display device 420 that delivers the image provided from the display element 410 to the eye of the user. The display device 420 may be applied to glass of the glasses. The display element 410 is shown independently of the display device 420, but this is merely for convenience of a description and the display element 410 may be included in the display device 420.

The display device according to an embodiment may be applied to, for example, a virtual reality (VR) device, an AR device, a mixed reality (MR) device, a head-up display device, a flat-panel display device, etc. VR is a technology that allows people to feel as if interacting with real surroundings without directly experiencing an environment that is difficult to experience on a daily basis, and AR augments virtual information in real time in a real space to allow a user to interact with the augmented virtual information, thereby improving work efficiency. MR is a concept including VR and AR and may build a new space where a real object and a virtual object interact with each other in real time by mixing a real space and a virtual space. By combining immersion that is an advantage of AR with realism that is an advantage of AR, MR may be applied to various fields in the form of a head-mounted display (HMD), smart glasses, etc.

A display device according to an embodiment includes a display element configured to output light to display an image, a waveguide including a first surface to which the light is incident and a second surface opposite the first surface, an input coupler provided on the waveguide and configured to input the light into the waveguide, a telecentric assembly provided between the display element and the waveguide, the telecentric assembly being configured to cause incident angles of light beams incident on the input coupler to be same as each other, and an output coupler configured to output light propagating in the waveguide to an outside of the waveguide.

Light output from the display element may be incident on the telecentric assembly without being diffused, and the light may be incident on the input coupler with a cross-sectional area that is equal to an area of the display element based on the telecentric assembly.

The waveguide may have a thickness t satisfying $t = W1/2\tan(\theta)$, where W1 is a width of the display element and $\theta i$ an angle of diffraction of light diffracted in the input coupler.

The telecentric assembly may include a first lens, a second lens separated from the first lens, and an optical filter provided between the first lens and the second lens.

The output coupler may include a direction selection diffuser provided on one of a first surface of the waveguide and a second surface of the waveguide, and a lens array provided on the other of the first surface of the waveguide and the second surface of the waveguide.

The direction selection diffuser may include a hologram pattern configured such that a diffraction efficiency increases along a propagating direction of light in the waveguide.

The output coupler may include a polarization volume grating provided on one of a first surface of the waveguide and a second surface of the waveguide, and a lens array provided on the other of the first surface of the waveguide and the second surface of the waveguide.

The display device may further include a polarization modulation layer between the waveguide and the lens array.

The output coupler may include a polarization volume grating provided on one of a first surface of the waveguide and a second surface of the waveguide, and a geometric phase lens array provided on the other of the first surface of the waveguide and the second surface of the waveguide.

The display device may further include a circular polarizer separated from the polarization volume grating, wherein the circular polarizer is configured to transmit circular polarization in a direction opposite to circular polarization transmitted by the polarization volume grating.

A circular polarizer may be provided between the telecentric assembly and the waveguide.

The display element may include a first display element configured to output first light and a second display element configured to output second light, and the first display element may be configured to emit the first light to be incident on a first side of the waveguide and the second display element may be configured to emit the second light to be incident on a second side of the waveguide.

The input coupler may include a first input coupler corresponding to the first display element and a second input coupler corresponding to the second display element.

The display device may further include an optical element configured to split light output from the display element propagate along a first optical path and a second optical path.

The input coupler may include a first input coupler onto which light propagated through the first optical path is incident and a second input coupler onto which light propagated through the second optical path is incident.

The output coupler may include a first direction selection diffuser configured to output first light incident on the waveguide through the first input coupler and a second direction selection diffuser configured to output second light incident on the waveguide through the second input coupler.

A width of the display element may be equal to a width of the input coupler.

The output coupler may include a lens array that includes a plurality of lenses, each of the plurality of lenses having a width that is equal to a width of the display element.

An electronic device according to an embodiment includes a display device including a display element configured to output light to display an image, a waveguide including a first surface to which the light is incident and a second surface opposite the first surface, an input coupler provided on the waveguide and configured to input the light into the waveguide, a telecentric assembly provided between the display element and the waveguide, the telecentric assembly being configured to cause incident angles of light beams incident on the input coupler to be same as each other, and an output coupler configured to output light propagating in the waveguide to an outside of the waveguide.

Light output from the display element may be incident on the telecentric assembly without being diffused, and the light may be incident on the input coupler with a cross-sectional area that is equal to an area of the display element based on the telecentric assembly.

The above embodiments are merely illustrative, and various modifications and equivalent other embodiments may be made therefrom by those of skill in the art. Therefore, the true technical protection range of an embodiment of the disclosure should be defined by the technical spirit set forth in the claims and their equivalents.

What is claimed is:

1. A display device comprising:
    a display element configured to output light to display an image;
    a waveguide comprising a first surface to which the light is incident and a second surface opposite the first surface;
    an input coupler provided on the waveguide and configured to input the light into the waveguide;
    a telecentric assembly provided between the display element and the waveguide, the telecentric assembly being configured to cause incident angles of light beams incident on the input coupler to be same as each other; and
    an output coupler configured to output light propagating in the waveguide to an outside of the waveguide,
    wherein the output coupler comprises a polarization volume grating provided on one of the first surface of the waveguide and the second surface of the waveguide, and a lens array provided on the other of the first surface of the waveguide and the second surface of the waveguide.

2. The display device of claim 1, wherein light output from the display element is incident on the telecentric assembly without being diffused, and the light is incident on the input coupler with a cross-sectional area that is equal to an area of the display element based on the telecentric assembly.

3. The display device of claim 1, wherein the waveguide has a thickness t satisfying:

$t = W1/2 \tan(\theta)$, where W1 is a width of the display element and $\theta$ is an angle of diffraction of light diffracted in the input coupler.

4. The display device of claim 1, wherein the telecentric assembly comprises a first lens, a second lens separated from the first lens, and an optical filter provided between the first lens and the second lens.

5. The display device of claim 1, further comprising a polarization modulation layer between the waveguide and the lens array.

6. The display device of claim 1, wherein the display element comprises a first display element configured to output first light and a second display element configured to output second light, and
    wherein the first display element is configured to emit the first light to be incident on a first side of the waveguide and the second display element is configured to emit the second light to be incident on a second side of the waveguide.

7. The display device of claim 6, wherein the input coupler comprises a first input coupler corresponding to the first display element and a second input coupler corresponding to the second display element.

8. The display device of claim 1, further comprising an optical element configured to split light output from the display element to propagate along a first optical path and a second optical path.

9. The display device of claim 8, wherein the input coupler comprises a first input coupler onto which light propagated through the first optical path is incident and a second input coupler onto which light propagated through the second optical path is incident.

10. The display device of claim 9, wherein the output coupler comprises a first direction selection diffuser configured to output first light incident on the waveguide through the first input coupler and a second direction selection diffuser configured to output second light incident on the waveguide through the second input coupler.

11. The display device of claim 10, wherein a width of the display element is equal to a width of the input coupler.

12. The display device of claim 1, wherein the lens array comprises a plurality of lenses, each of the plurality of lenses having a width that is equal to a width of the display element.

13. An electronic device comprising:
    a display device comprising:
        a display element configured to output light to display an image;
        a waveguide comprising a first surface to which the light is incident and a second surface opposite the first surface;
        an input coupler provided on the waveguide and configured to input the light into the waveguide;
        a telecentric assembly provided between the display element and the waveguide, the telecentric assembly being configured to cause incident angles of light beams incident on the input coupler to be same as each other; and
        an output coupler configured to output light propagating in the waveguide to an outside of the waveguide, wherein the output coupler comprises a polarization volume grating provided on one of the first surface of the waveguide and the second surface of the waveguide, and a geometric phase lens array provided on the other of the first surface of the waveguide and the second surface of the waveguide.

14. The electronic device of claim 13, wherein light output from the display element is incident on the telecentric assembly without being diffused, and the light is incident on the input coupler with a cross-sectional area that is equal to an area of the display element based on the telecentric assembly.

* * * * *